United States Patent

[11] 3,593,864

[72] Inventor William H. Moser
　　　　　　　Paris, Tex.
[21] Appl. No. 881,989
[22] Filed Dec. 4, 1969
[45] Patented July 20, 1971
[73] Assignee CCI Corporation
　　　　　　　Tulsa, Okla.
　　　　　　　Continuation-in-part of application Ser. No.
　　　　　　　673,043, Oct. 5, 0167, now Patent No.
　　　　　　　3,482,717.

[54] SELF-UNLOADING TRAILER
　　　3 Claims, 8 Drawing Figs.
[52] U.S. Cl. .................................................. 214/83.36,
　　　　　　　　　　　　　　　　　　　　　　　　198/184
[51] Int. Cl. ................................................... B60p 1/38
[50] Field of Search ........................................ 214/1 H,
　　　　　　　　　　　　　　　　　　　　　　　83.36; 198/184

[56] References Cited
UNITED STATES PATENTS
3,477,558　11/1969　Fleischauer ..................　214/1 AB
3,481,647　12/1969　Cook ..........................　214/83.36 X Primary Examiner—Albert J. Makay
Attorney—Head & Johnson ABSTRACT: A trailer having upstanding side and front walls includes directly over the top of the floor thereof a first endless conveyor belt, the actuation of which moves the material received thereon rearwardly from the trailer during unloading. In one embodiment of the invention, a second belt is interposed between the floor and the first conveyor belt for reducing friction between thereby increasing the load capabilities of the trailer. In a second embodiment of the invention, pressurized air is forced upwardly through the floor to raise the endless belt therefrom in order to increase the load capabilities of the trailer.

PATENTED JUL 20 1971

INVENTOR.
WILLIAM H. MOSER

BY Head & Johnson

ATTORNEYS

SELF-UNLOADING TRAILER

CROSS-REFERENCES

This is a continuation-in-part of my former patent application Ser. No. 673,043 dated Oct. 5, 1967, now U.S. Pat. No. 3,482,717 and which is incorporated herein by reference.

BACKGROUND OF THE INVENTION

As is pointed out in my previous application, conventional dump trailers, presently being used in the industry, consist of a bed mounted on an over-the-road type trailer undercarriage and utilize hydraulic cylinders to raise the bed upwardly relative to the undercarriage for unloading. These trailers are adapted to be pulled by conventional tractors having means for powering the hydraulic cylinders. Among the many disadvantages of the conventional dump trailers is the fact that there is an ever present danger of the trailer overturning on soft or slanted ground due to the high center of gravity that exists when the bed is raised. A second disadvantage is that dump trailers cannot be unloaded where there are many overhead obstructions which the front of the bed may become entangled with when it is raised. Also, dump-type vehicles cannot dump their loads at a uniform rate of flow which is often desirable in roadway construction.

The aforesaid copending patent application disclosed a trailer provided with an endless conveyor belt overlying the floor for automatically unloading materials carried in the trailer and which overcame the various disadvantages inherent in conventional dump trailers. This invention is directed to improvements in said trailer and specifically to method and means for increasing the load capabilities yet maintain or decrease the power requirements to move such load.

SUMMARY OF THE INVENTION

The invention generally comprises a load carrying bed having upstanding side and front walls and an upwardly pivotal end wall. The bed is carried and supported by a conventional truck undercarriage. Overlying the floor and travelable in either direction is an endless belt conveyor for automatically loading and/or unloading materials received thereon. In one embodiment a second endless belt is interposed between the first belt and the floor and is travelable in synchronism with the outer belt. In another embodiment of the invention, pressurized air is forced through perforations in the floor to raise the belt carrying the load therefrom during loading and/or unloading thereby reducing the friction between the belt and the floor. Both embodiments permit the trailer to carry larger loads without necessarily increasing the power requirement of the endless belt driving means.

DETAILED DESCRIPTION OF THE PREFERRED EMBODIMENT

Figure 1:
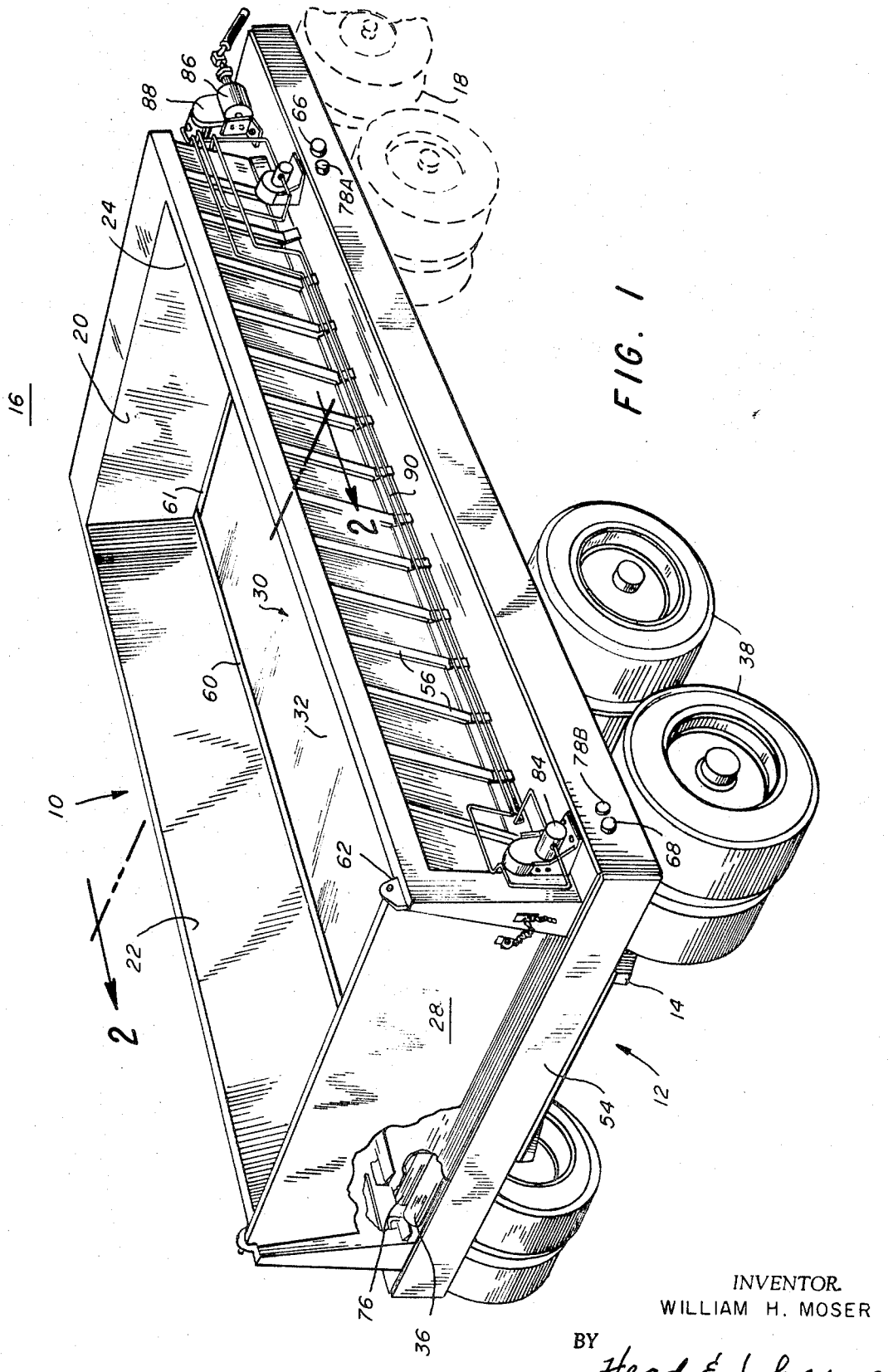
FIG. 1 is a perspective view showing a trailer constructed in accordance with the concepts of the invention.
Figure 2:
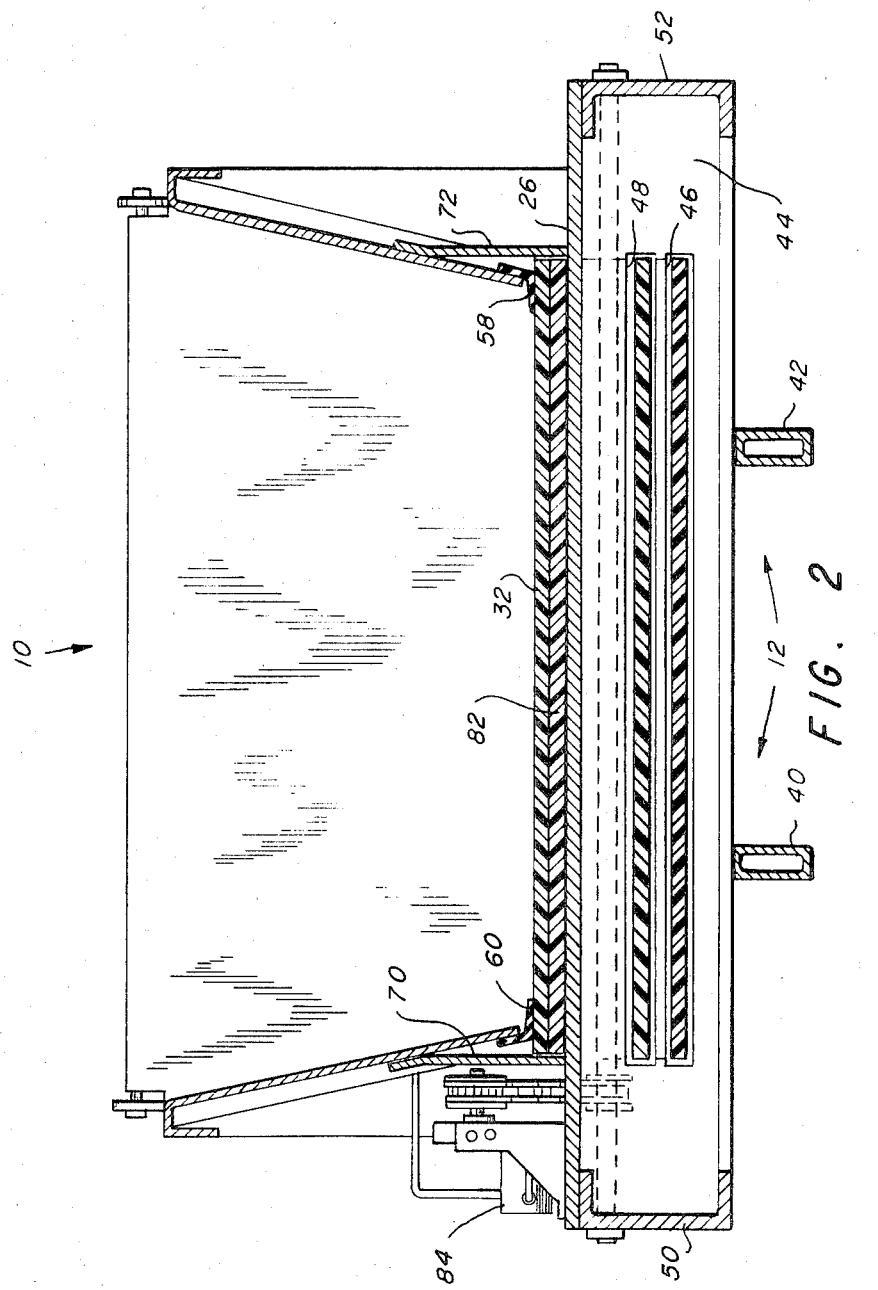
FIG. 2 is a cross-sectional view of the trailer as shown in Fig. 1 taken along the line 2-2 thereof.

Referring now to Figs. 1 and 2 of the drawings, a trailer denoted generally by the reference 10, includes the major structural components of a frame 12 supported by an undercarriage 14 and a body 16. The trailer is pulled by a conventional tractor 18, the rearward wheels of which are partially shown, releasably coupled thereto by suitable means which are commonly known by a man skilled in the art.

The body 16 comprises generally a front wall 20, opposing sidewalls 22 and 24, a floor 26, and a tailgate 28.

A first endless conveyor belt 30 is mounted in association with the floor 26 of the trailer and is adapted to have its upper run 32 overlaying the central part of the upper surface of the floor. The belt 30 is supported and driven by a forward roller 34, shown in FIG. 3, and a rearward roller 36, at the respective ends of the trailer.

The undercarriage 14 is of a conventional type and normally comprises either one or two sets of wheels 38 interconnected by a common axis and suspended from the carriage by suitable leaf springs. As pointed out in my first application, an advantage peculiar to the present trailer as opposed to the dump-type trailers is a feature that the undercarriage may be mounted further forward than is shown in the drawings to distribute the load evenly over the axis when the trailer is being pulled. This is important since most states have a load limit in pounds per axle for tractor trailers that are driven over public roads.

Referring now to FIG. 2, it can be seen that the frame includes a pair of main frame members 40 and 42. A plurality of structural crossmembers 44 are attached transversely on the top of the box members and spaced along their length for supporting the floor. The members 44 include either a single centrally disposed elongated slot for the lower run of both belts 32 and 82, or a separate and parallel lower slot 46 for allowing passage of the lower run of the first endless belt 32 and an upper elongated slot 48 for the lower run of belt 82.

A pair of end plates 50 and 52 are attached to the ends of the structural member 44 at either side of the trailer and are adapted to serve as mounting frames for the belt rollers. A butt plate 54, see FIG. 1, may be attached across the back of the frame between the end plates to protect the rear roller 36 from damage during the unloading operation or when the truck is backed up against a dock. Floor 26 of the trailer is constructed from heavy gauge sheet steel laid across the crossmembers 44.

Sidewalls 22 and 24 are strengthened by vertically disposed stiffeners 56 which are attached to the outside thereof. The sidewalls are flat and inclined slightly inwardly so that material will feed easily onto the moving belt 32. Sidewall extension plates 70 and 72 are provided to attach the walls respectively to the trailer floor 26 and to assist in supporting the sidewalls.

In order to prevent leakage of the material received within the bed, longitudinal seals 58 and 60 are attached along the outside of the lower edges of the walls 22 and 24 and extend inwardly therefrom over the upper surface of the belt whereby material carried in the trailer will bear down upon the upper surface of the seals causing them to press upon the belt to prevent any leakage of the material from the bed. Similarly transverse seal 61 transversing along the bottom edge of front wall 20 extends inwardly therefrom to provide sealing means.

Tailgate 28 is pivoted at the upper rear corners of the sidewalls by brackets 62 thereby allowing it to swing rearwardly and upwardly in response to the force of the material against the frontal surface thereof. To limit the swing of the tailgate during the unloading operation and also to lock the tailgate while the material is being transported, an appropriate tailgate latching mechanism 64 is provided.

The invention as thus far described is in accordance with the description of the preferred embodiment as given in my previous patent application Ser. No. 673,043 having a filing date of Oct. 5, 1967, and reference is made thereto for the specific construction and cooperation of the components heretofore mentioned. Attention will now be specifically directed to the improvements over the invention disclosed in my previous application. As before mentioned, the improvements pertain to embodiments which increase the load hauling and unloading capabilities of the trailer without necessitating augmentation of the powering means for the belt conveyor.

Figure 3:
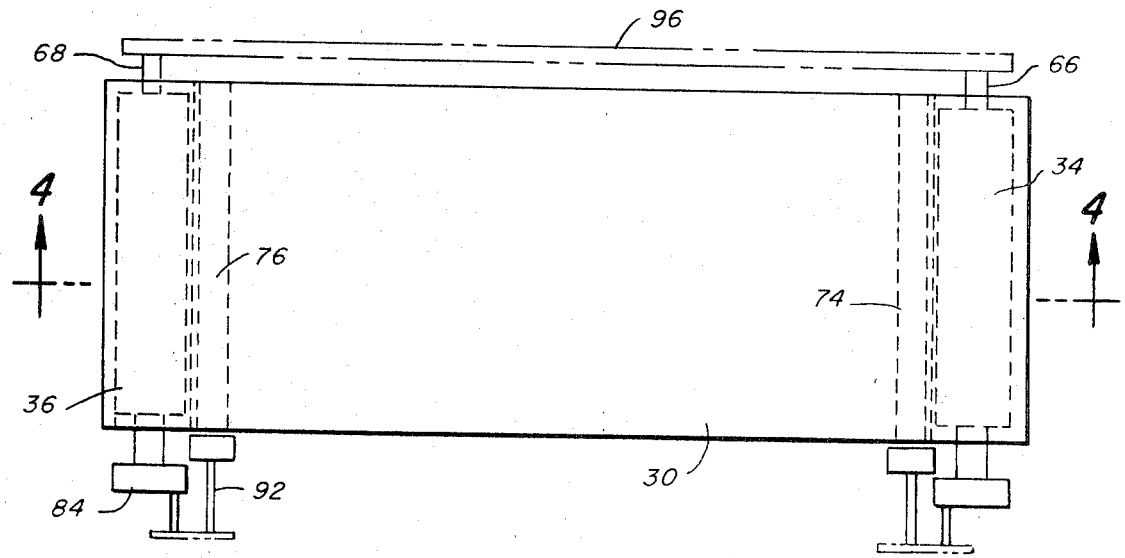
FIG. 3 is a schematic top view of one of the improved embodiments of the invention.
Figure 4:
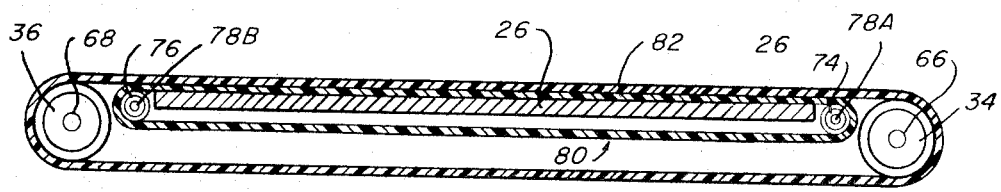
FIG. 4 is a schematic cross-sectional view taken along line 4-4 of Fig. 3 and showing the impositioning of a second endless belt between the floor of the trailer and the first endless belt.

Referring now to FIGS. 3 and 4, the first conveyor belt 30 is schematically shown received on and running between forward roller 34 and rearward roller 36. Forward roller 34 is secured to a shaft 66 transversing between and rotatably received in the forward portion of end plates 50 and 52. Likewise, the rearward roller 36 is received on shaft 68 running between and rotatably journaled in the rearward portion of the end plates 50 and 52.

An inner forward roller 74 and an inner rearward roller 76 which are supported by shafts 78A and 78B transversing between and rotatably received in end plates 50 and 52 carry a second endless belt 80 whose upper flight 82 passes between the upper surface of the floor 26 and the undersurface of the belt 30 and the lower flight thereof travels through slot 48. As can be seen by FIG. 4, rollers 74 and 76 are positioned relative to the upper surface of the floor 26 such that the upper flight of belt 32 rides directly thereover. Likewise rollers 34 and 36 are positioned relative to the upper flight of belt 80 such that the upper flight 32 of belt 30 rides directly thereover. The introduction of second endless belt 80 reduces the torque required to initiate rearward movement of belt 30 by diminishing the coefficient of static friction.

As shown in FIG. 3, hydraulic motors 84 are connected to the shafts 66 and 68 for driving rollers 34 and 36. The hydraulic motors are powered by a suitable power-takeoff means located on the tractor which drives hydraulic pump 86 which may be located, for example, on the forward end of the trailer which in turn supplies hydraulic fluid from a reservoir 88 to the motors 84 through conduits 90. It is understood, however, that the pump 86 may be located elsewhere for convenience. Although, in the schematic, the motors are shown connected directly to the shafts, it is to be understood that appropriate speed reducers may be employed, if required, the installation of which is believed to be obvious to the one skilled in the art. For a detailed description of the hydraulic powering means and the connections thereof, reference is made to my previous application.

In one embodiment the belts may be synchronized. For example, hydraulic motors 84 as shown in FIG. 3 are interconnected to the endless conveyor belt 30 through a suitable synchronizer 92 such as a chain and sprocket mechanism, and speed reducer 94. In FIG. 3 an endless timing chain 96 engaging sprockets on the ends of shafts 66 and 68 opposite the end receiving the speed reducers 94 synchronize the speed thereof. It is to be understood, however, that the belt driving system as shown in FIG. 3 is merely one of a variety of means which may be employed. Depending upon the load capability desired, it is possible that only one of the belts and then only at one end be power driven or as another example, it is possible that one end of each belt be powered.

Figure 5:
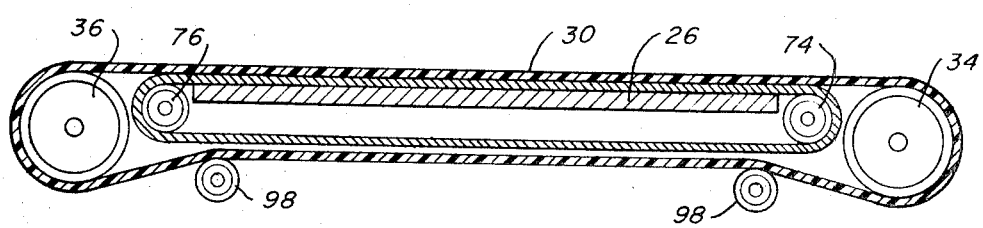
FIG. 5 is a cross-sectional view schematically showing the floor of the trailer and a first and second endless belt conveyor disposed thereover, the second endless belt being fabricated from woven material.

A variation of the first embodiment is shown in FIG. 5 where the second belt 80 is of the woven metal type to reduce the friction contact with floor 28. Idling rollers 98 tangentially received on the lower flight of endless belt 30 outside of the loop thereof provide tension adjustment means for the belt 30.

Figure 6:
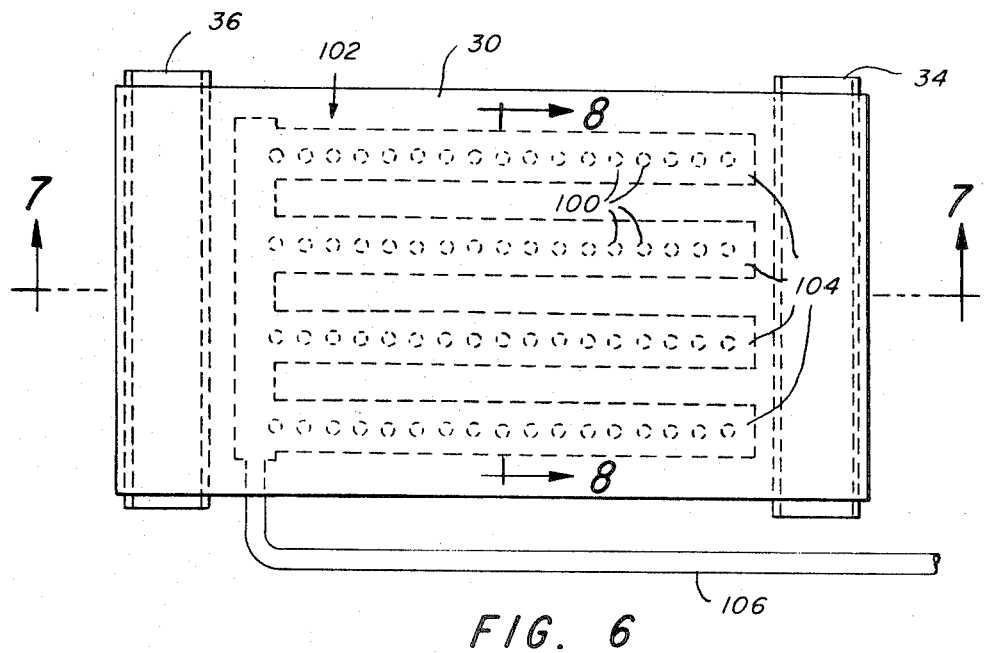
FIG. 6 is a schematic elevational view showing an endless belt conveyor disposed over the floor of the trailer and an air-distribution manifold for distributing pressurized air through perforations in the floor beneath said conveyor.
Figure 7:
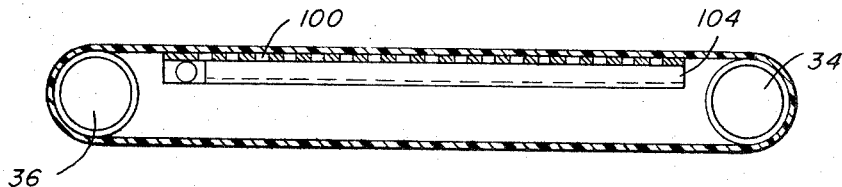
FIG. 7 is a cross-sectional view of the embodiment of the invention shown in Fig. 6 taken along line 7-7.
Figure 8:
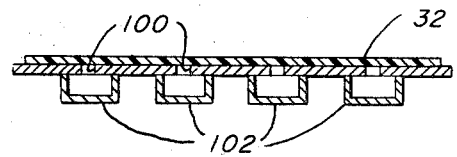
FIG. 8 is a cross-sectional view taken along the line 8-8 of Fig. 6.

Turning now to FIGS. 6, 7 and 8, a second improvement is shown. Here, as in the previous examples, and in my original application, an endless flat belt 30 is mounted on and carried by a forward roller 34 and a rearward roller 36 in such a manner that the belt passes directly over the floor 26 of the trailer. In this improvement the floor has therethrough a plurality of transverse perforations 100 arranged in longitudinal laterally spaced rows, although other perforation patterns may be used. Secured to the underside of the floor is a fluid, e.g., air-distribution manifold 102 having a plurality of branch members 104 forming fluid chambers in communication with perforations 100. Connected to one end of the fluid distribution manifold is a conduit 106 which supplies pressurized air or hydraulic fluid to the manifold from a reservoir. The reservoir (not shown) may be powered by suitable takeoff means from the tractor vehicle and is provided with the necessary valving such that when the belt is engaged to commence movement of the load pressurized fluid flows through the air distribution manifold 102 and out perforations 100 causing the upper flight 32 of belt 30 to be raised upwardly from floor 26. The fluid cushion thus formed disposed between the belt and the floor, reduces the coefficient of static friction between the belt and the floor.

The operation of the trailer and the advantages thereof over present dump-type trailers is taught in my previous application Ser. No. 673,043. The improvements herein disclosed further expand the utility of the trailer by increasing the load capacity thereof.

During the discussion of the preferred embodiments of this invention, the specific terminology has been used for the sake of clarity. However, it is to be understood that such is used for the sake of clarity only and are not to be construed as words of limitation.

What I claim:

1. A self-unloading cargo body to be carried by a vehicle frame including a pair of spaced apart, longitudinal support members comprising:
    a body including a substantially flat, load supporting floor, opposed sidewalls and a front wall; said body further including a plurality of transverse spaced apart crossmembers attached to said frame and supporting said floor above said frame, each of said crossmembers defining two spaced apart elongated horizontally disposed slots;
    a first endless conveyor mounted in said body in association with the floor thereof, said first conveyor comprising:
        a pair of outer rollers transversely received on said body in laterally spaced relationship, and
        an endless belt supported by said rollers such that the upper run thereof passes directly over said floor of said body and said lower run passes beneath said floor through one of said horizontally disposed slots in said crossmembers;
    a second endless conveyor mounted in said body in association with said first conveyor, said second conveyor comprising:
        a pair of laterally spaced inner rollers transversely received on said body inwardly of said outer rollers; and
        an inner endless belt supported by said inner rollers such that the upper flight thereof passes directly beneath the upper flight of first belt and the lower flight there passes beneath said floor through the other of said horizontally disposed slots in said crossmembers; and
    driving means coupled to at least one of said outer rollers for causing travel of said outer endless belt whereupon frictional contact between the bottom side of said upper flight of said outer belt and the top side of said upper flight of said inner belt effects travel of said lower belt.

2. A cargo body as in claim 1 including driving means coupled to at least one of said inner rollers to cause travel of said inner endless belt; and
    means coupled to said inner and outer rollers for synchronizing said travel of said inner and outer endless rollers.

3. A cargo body as in claim 1 wherein:
    said outer rollers have bonded thereto on the outer surface thereof lagging material providing a higher coefficient of friction between said roller and said outer endless belt than the coefficient of friction between said outer endless belt and said inner endless belt.